United States Patent
Qualy et al.

(10) Patent No.: US 7,789,360 B2
(45) Date of Patent: Sep. 7, 2010

(54) CONSTANT TENSION POLE MOUNT BRACKET

(75) Inventors: Stephen J. Qualy, Shakopee, MN (US); Cindy M. Ruby, Bloomington, MN (US); Michael J. Wayman, Waconia, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 521 days.

(21) Appl. No.: 11/697,425

(22) Filed: Apr. 6, 2007

(65) Prior Publication Data

US 2008/0245938 A1 Oct. 9, 2008

(51) Int. Cl.
*E04G 5/06* (2006.01)

(52) U.S. Cl. .............. 248/218.4; 248/219.4; 248/230.8; 248/229.17

(58) Field of Classification Search .............. 248/218.4, 248/219.4, 219.1, 219.3, 230.8, 228.8, 229.17, 248/524, 523, 541; 211/107; 108/151, 152; 182/187

See application file for complete search history.

(56) References Cited

U.S. PATENT DOCUMENTS

| | | | | |
|---|---|---|---|---|
| 2,855,167 A | * | 10/1958 | Christophersen | ........... 248/27.1 |
| 3,241,800 A | * | 3/1966 | Richter, III | ............... 248/230.9 |
| 3,917,205 A | * | 11/1975 | Meadors | ................. 248/229.17 |
| 4,101,191 A | | 7/1978 | Gould et al. | |
| 5,310,151 A | * | 5/1994 | Engel | ....................... 248/230.8 |
| 5,340,069 A | | 8/1994 | Niemeyer | |
| 5,426,577 A | | 6/1995 | Gordin et al. | |
| 5,600,537 A | | 2/1997 | Gordin et al. | |
| 5,601,263 A | * | 2/1997 | Thayer | ......................... 248/75 |
| 5,950,359 A | * | 9/1999 | Pivnik | ............................ 47/43 |
| 6,185,303 B1 | | 2/2001 | Losey | |
| 6,398,392 B2 | | 6/2002 | Gordin et al. | |
| 6,486,399 B1 | | 11/2002 | Armstrong et al. | |
| 6,974,908 B2 | | 12/2005 | White | |
| 7,059,572 B2 | | 6/2006 | Ware et al. | |
| 7,316,376 B1 | | 1/2008 | Engler | |
| 7,424,992 B1 | * | 9/2008 | Dziedzic | .................. 248/218.4 |

* cited by examiner

*Primary Examiner*—Anita M King
(74) *Attorney, Agent, or Firm*—Fogg & Powers LLC

(57) ABSTRACT

A pole mount bracket is provided. The bracket includes at least one extruded portion, a pole mounting portion and a band. The at least one extruded portion has an engaging surface. The engaging surface has a plurality of grooves that allow the extruded portion to bend to the form of a pole. The pole mounting portion is connected to the at least one extruded portion. Moreover, the pole mounting portion is further configured to be selectively coupled to a device. The band is configured to deform the at least one extruded portion about the pole to attach the pole mount bracket to the pole.

18 Claims, 5 Drawing Sheets

CONSTANT TENSION POLE MOUNT BRACKET

BACKGROUND

The ability to mount equipment on a pole, such as communication equipment, can be very challenging especially when the equipment is heavy and the diameter of the pole may vary from one location to another. Currently, specialized brackets are needed to fit specific diameters of poles. Moreover, mounting the equipment currently requires one technician to hold the device in place and another attach the device with a bracket. This becomes very difficult when the device can weigh 150 lbs. Another problem encountered with current mounting systems is that they are prone to loosen due to vibrations. In particular, the vibrations the poles are subject to can cause the brackets to become loose which may result in the device falling to the ground.

For the reasons stated above and for other reasons stated below which will become apparent to those skilled in the art upon reading and understanding the present specification, there is a need in the art for an effective and easy to use mounting bracket that can be used with different diameter poles and is not subject to vibrations.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a pole mount bracket is provided. The bracket includes at least one extruded portion, a pole mounting portion and a band. The at least one extruded portion has an engaging surface. The engaging surface has a plurality of grooves that allow the extruded portion to bend to the form of a pole. The pole mounting portion is connected to the at least one extruded portion. Moreover, the pole mounting portion is further configured to be selectively coupled to a device. The band is configured to deform the at least one extruded portion about the pole to attach the pole mount bracket to the pole.

BRIEF DESCRIPTION OF THE DRAWINGS

The present invention can be more easily understood and further advantages and uses thereof more readily apparent, when considered in view of the detailed description and the following figures in which.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Embodiments of the present invention provide a pole bracket that has at least one extruded portion that deforms to the surface diameter of a pole when strapped to the pole. The at least one extruded portion exerts a pressure (a constant tension) on a band used to strap the extruded portion to the pole thereby preventing the band from becoming loose. In some embodiments, the design of the pole bracket includes dampening functions that reduce vibrations waveforms in the pole bracket. In particular, in one embodiment a cavity is formed by two connecting portions that dampen vibrations between two extruded portions. In another embodiment, rubber cores are incorporated in each extruded portion to dampen vibrations. Further in some embodiments, a mounting system includes a pole bracket that is designed so that a device being mounted on a pole is simply lifted into place where it is held in place by the mounting system while it is being attached to the pole.

Figure 1:
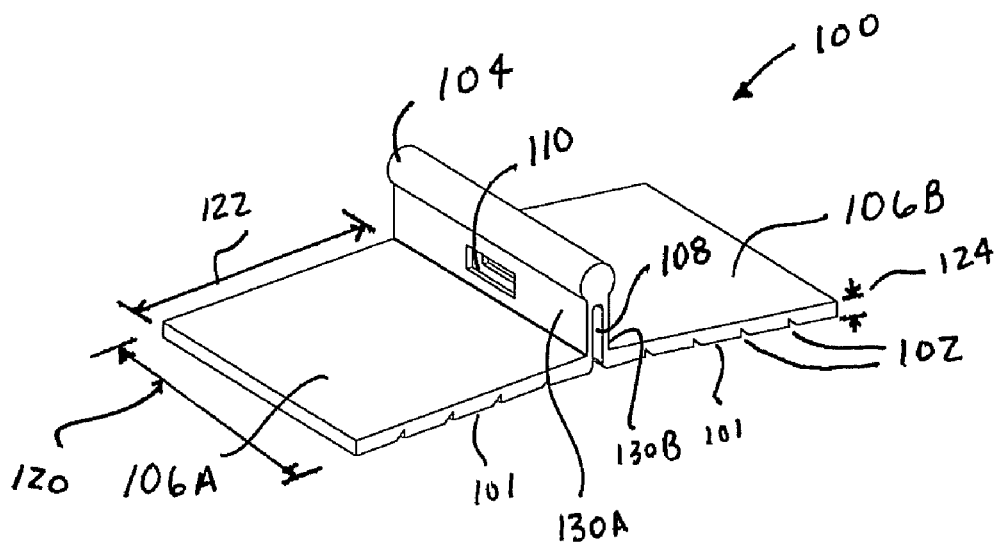
FIG. 1 is side perspective view of a pole bracket of one embodiment of the present invention.

Referring to FIG. 1, a side prospective view of a first embodiment of a pole mount bracket 100 is illustrated. As illustrated, in this embodiment, the pole mount bracket 100 (pole bracket 100) includes a first and second extruded portion 106A and 106B, first and second connection portions 130A and 130B and a pole mounting portion 104. Each of the extruded portions 106A and 106B includes grooves 102 (or notches) that allow the extruded portions to bend under tension. In one embodiment, the grooves 102 are formed in an engaging surface 101 of the extruded portions 106A and 106B. In one embodiment, the grooves 102 form a fillet or rib pattern in the extruded portions 106A and 106B. Grooves 102 having different shapes are contemplated. Each extruded portion has a given thickness 124, a given length 120 and a given width 122. Each of the dimensions is selected dependant on the size and weight of the device to be mounted on the pole. For example, the length 120 or width 122 of each protrusion 106A and 106B can be extended when the pole bracket 100 is to be used for a heavy device such as a filter. Likewise, the length 120 or the width 122 of each extruded portion 106A and 106B can be reduced when the pole bracket is to be used for a lighter device or two or when more pole brackets 100 are used to hang the device on a pole. In one embodiment, the extruded portions 106A and 106B are made of sheet metal, aluminum or the like. Moreover, other types of material that exerts a force to maintain the material in a generally flat sheet form when bent are also contemplated. The extruded portions can be formed by casting, extruding and other like processes.

The pole bracket 100 in FIG. 1 also illustrates a pole mounting portion 104 that is connected to the respective first and second extruded portions 106A and 106B via first connecting and second connecting portions 130A and 130B. The pole mounting portion 104 and the first and second connecting portions 130A and 130B form a dampening cavity 108. In particular, cavity 108 interrupts vibration waveforms from traveling between the first and second connecting portions 103A and 103B thereby damping vibrations when the pole bracket 100 is mounted to a pole. Interrupting the vibrations waveforms in the first and second connecting portions 103A and 103B help prevent loosening of the pole mounting bracket 100 due to the vibrations in the pole. Also illustrated in FIG. 1 is a mounting band aperture 110. A band is passed through the mounting band aperture 110 to strap the pole bracket 100 to a pole. When strapped to a pole, the engaging surface 101 of the first and second extruded portions 106A and 106B engage a surface of the pole.

Figure 2A:
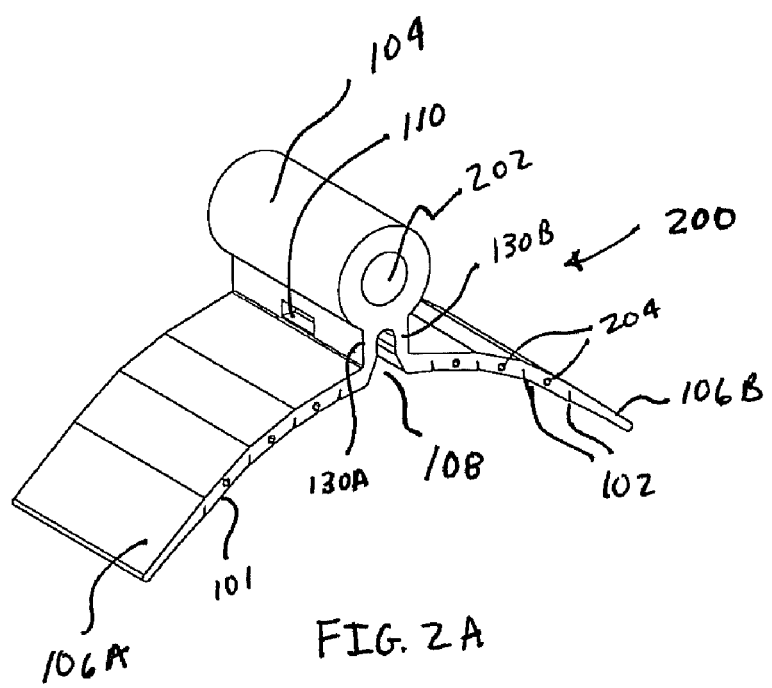
FIG. 2A is a side perspective view of a pole bracket of another embodiment illustrating how it bends.

Referring to FIG. 2A, a side perspective view of another pole bracket 200 is illustrated. This view illustrates how the first and second extruded portions 106A and 106B curve to fit a given diameter of a pole. As discussed above, the grooves 102 allow the first and second extruded portions 106A and 106B to bend. Further as discussed above, the material the first and second extruded portions 106A and 106B are made of causes the first and second extruded portions 106A and 106B to exert a force that tries to straighten the first and second extruded portions 106A and 106B back to a flat position when curved as illustrated in FIG. 2A. The embodiment of the pole bracket 200 of FIG. 2A also includes a pole pin aperture 202 that passes through the pole mounting portion 104. The pole pin aperture 202 of this embodiment is used to secure a device to the pole bracket 200.

Figure 2B:
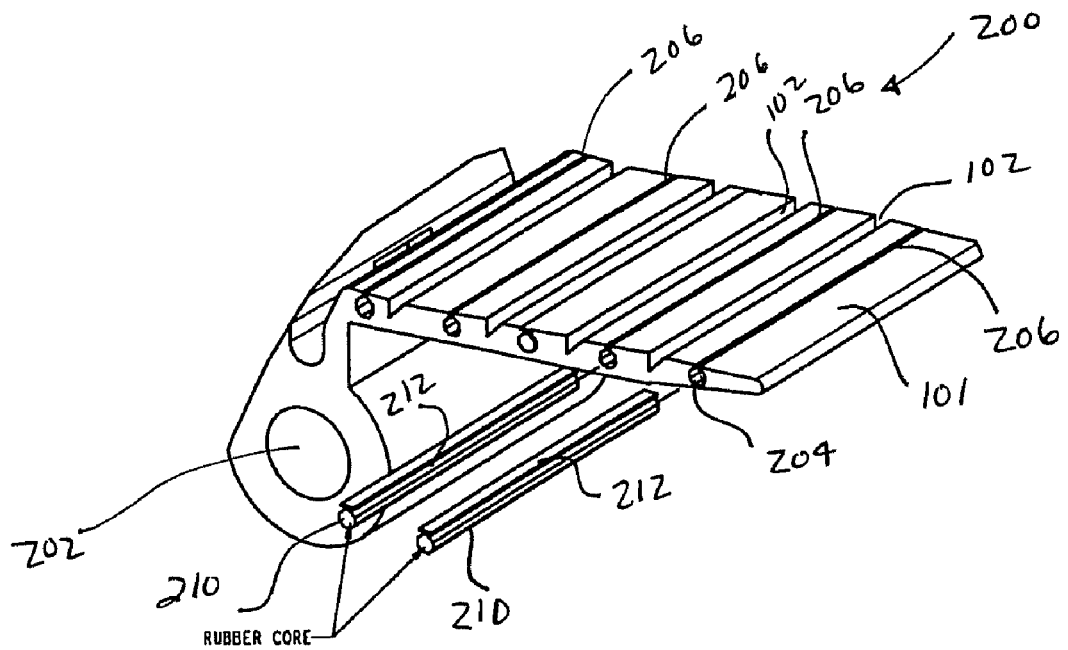
FIG. 2B is a partial side view of the pole bracket of FIG. 2A illustrating receiving bores and cores of one embodiment of the present invention.
Figure 2C:
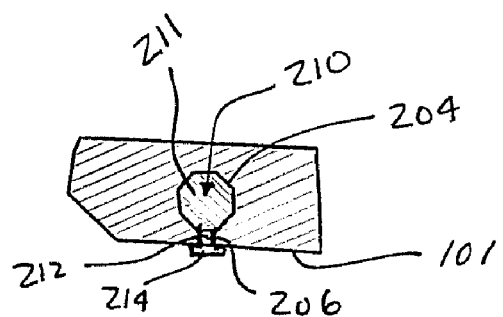
FIG. 2C is a cross-sectional side view of a section of an extruded portion including a bore and a rubber core of one embodiment of the present invention.

The pole bracket 200 embodiment of FIG. 2A also includes a plurality of receiving bores 204 that extend through at least a portion of the length of each extruded portion 106A and 106B. Referring to FIG. 2B, a partial side view of the pole bracket of FIG. 2A illustrates receiving bores 204. In this view, the engaging surface 101 is shown. Moreover, as illustrated in FIG. 2B, the extruded portion 106 has channels 206 that extend from the engaging surface 101 to an associated receiving bore 204. Cores 210 made of a rubber material are placed in each bore 204. FIG. 2C illustrates cross-sectional side view of a section of an extruded portion including a bore 204 and a rubber core 210. As illustrated, the core 210 includes a main portion 211, a neck portion 212 and an engaging portion 214. The main portion 211 is received in the bore 204. The bore 204 in this embodiment is in a regular polygon shape. In other embodiments, other shapes of bores 204 are used. The neck portion 212 is received in a channel 206 and the engaging portion 214 extends beyond the engaging surface 101 of the extruded portion 200. The cores 210 of this embodiment have at least three functions. The first function is to reduce vibration waves traveling through an associated extruded portion. Hence the cores 210 help to dampen vibrations that could lead to the loosening of the pole mount bracket. The second function is to provide an effective gripping surface to grip the surface of the pole. In particular, the engaging portion 214 of the core 210 grips the surface of the pole when the pole mount bracket is mounted to the pole. The third function is to reduce the effects of coefficient of thermal expansion (CTE) due to fluctuations in temperatures. The elasticity of the rubber core 210 absorbs the expansion and contractions of the engaging portions due to CTE thereby reducing the possibility of the pole mount bracket braking due to the CTE effects.

Figure 3:
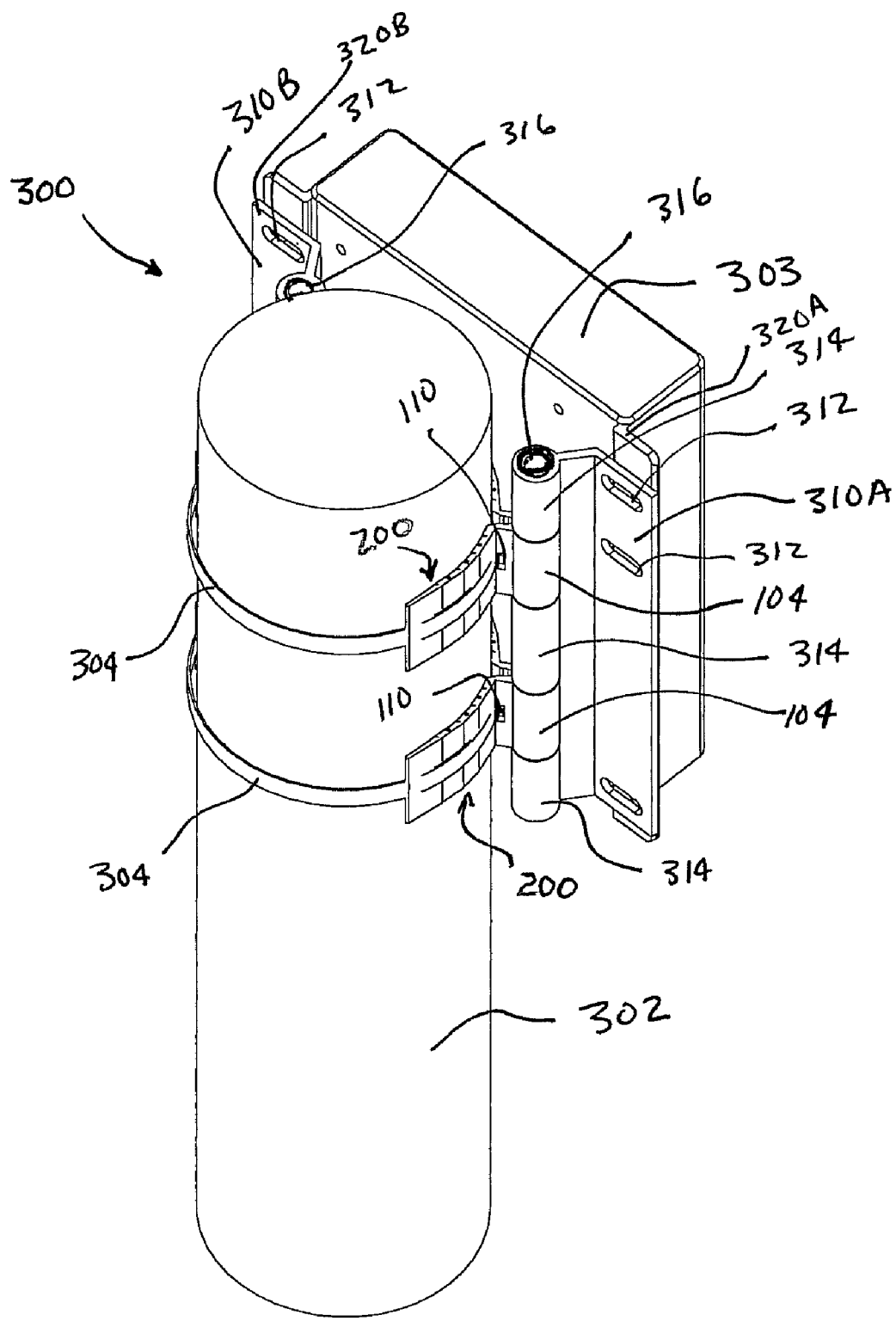
FIG. 3 is a side perspective view of a mounting kit of one embodiment of the present invention mounting a device to a pole.

FIG. 3 is a side perspective view of a mounting system 300 including a pole bracket 200 mounting a device 303 to a pole 302. As illustrated, the pole bracket 200 is mounted to the pole 302 via mounting band 304 that is passed through a respective mounting band aperture 110. The mounting band 304 is secured and tightened by techniques known in the art such as by a clamp screw, bolt attachment and the like. As illustrated, more than one pole bracket 200 can be used to mount a device 303 to a pole 302. Moreover, as illustrated, a single mounting band 304 can be used to secure more than one pole bracket 200 to the pole 302.

The mounting system 300 further includes first and second device mount brackets 310A and 310B. The first and second device mount brackets 310A and 310B (or first and second device brackets 310A and 310B) are attached to the device 303 via device mounting apertures 312. In particular, a bolt or similar attaching device is passed through a device mounting aperture 312 and a respective aperture in a device plate 320A and 320B and tightened. As illustrated, the first and second device bracket 310A and 310B in this embodiment include one or more device mounting portions 314. The device mounting portions 314 in this embodiment is similar to pole mounting portion 104 of the pole bracket 200 of FIG. 2. In particular, the device mounting portions 314 include a device pin aperture similar to the pole pin aperture 202 illustrated in FIG. 2.

Referring back to FIG. 3, once the first and second device brackets 310A and 310B are attached to the device 303, the device 303 is positioned so that the pole pin apertures 202 in the device mount portion 314 and the pole mount portion 104 are aligned. Once they are aligned, a holding pin 316 is simply passed though the respective pole pin apertures 202 to secure the device 303 to the pole bracket 200. As illustrated, in this embodiment, the first and second device brackets 310A and 310B include three device mount portions 314. When using the mounting system 300, a technician simply lifts the device 303 in position such that the device mounting portions 314 are in between the pole mounting portions 104 and then simply slides the holding pin 316, in place. While the technician is positioning the holding pin 316 at least a majority of the weight of the device 303 is being held up by the pole mounting portions 104 of the respective pole brackets 200. Hence, the mounting of the device 303 with the mounting system 300 provides an efficient and effective method of mounting relatively heavy devices 303.

Figure 4:
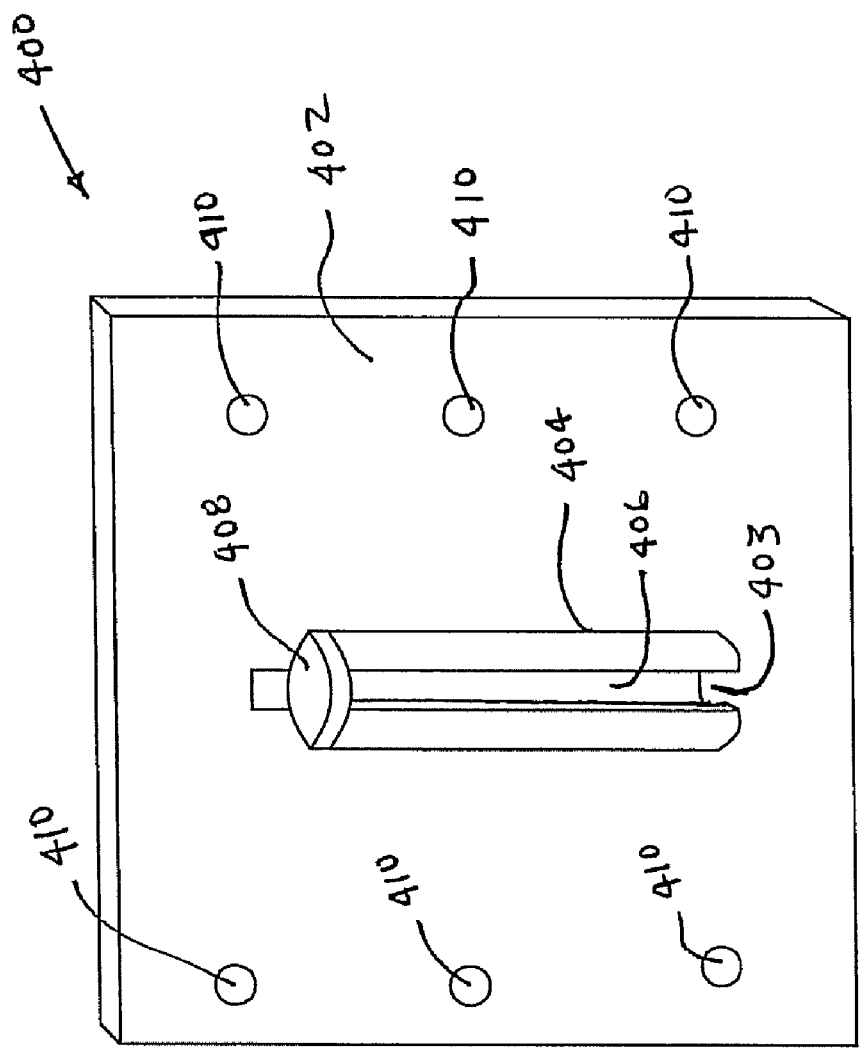
FIG. 4 is a front perspective view of a device bracket of one embodiment of the present invention.

FIG. 4 illustrates side perspective view of a device bracket 400 of another embodiment. This embodiment of the device bracket 400 includes a receiving portion 404, a connecting surface 402, and a plurality of device mount apertures 410. The device mount apertures 410 are used to attach the device mount bracket 400 to a device. The receiving portion 404 includes a receiving chamber 403 that is designed to receive a pole mounting portion 104 of a respective pole mount 100 such as the pole mount illustrated in FIG. 1. The receiving portion 404 further includes a receiving channel 406 designed to pass the first and second connection portions 130A and 130B when the pole mounting portion 104 is received in the receiving portion 404 of the device bracket 400. The receiving portion 404 also includes a stop 408 in this embodiment. The stop 408 holds the pole mounting portion 104 in the receiving portion 404. Hence, a mounting system including the pole bracket 100 and the device bracket 400 provide an easy method of attaching a device to a pole. In particular, a technician simply attaches a pole mounting bracket 100 to a pole as illustrated in FIG. 3 and attaches the device bracket 400 of FIG. 4 to a device. The technician then simply lifts the device and slides the pole mounting portion 104 of the pole bracket 100 into the receiving portion 404 of the device bracket. Hence only one technician is needed to mount the device.

Once the device is hung, secondary fasteners can be used if additional support of constraint is required.

Figure 5:
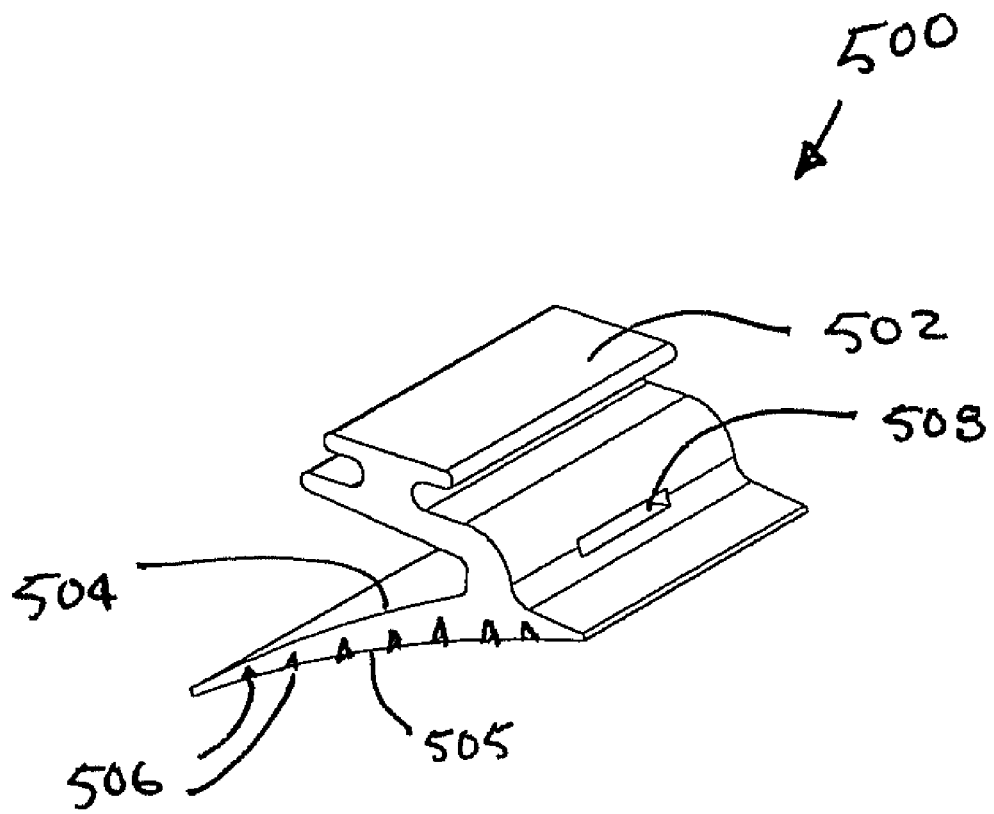
FIG. 5 is a side view of a pole bracket of another embodiment of the present invention.

FIG. 5 illustrates a side perspective view of another embodiment of a pole bracket 500. This pole bracket includes a single extruded portion 504 having grooves 506 in an engaging surface 505. As with the other embodiments, the grooves 506 allow the extruded portion 504 to bend to conform to the shape of the pole. Moreover, as with the other embodiments, the extruded portion 504 is made of a material that has a force that resists bending. The pole bracket 500 includes a mounting band aperture 508. A mounting band such as mounting band 304 of FIG. 3 is used to mount the pole bracket 500 to a pole. The pole bracket 500 further includes a pole mounting portion 502. The pole mounting portion 502 has a similar function as the pole mounting portion 104 of FIG. 1 but is in the shape of a flat plate. The pole mounting portion 502 is designed to be received in a receiving portion of a device bracket, similar to the receiving portion 404 of FIG. 4 except that the receiving channel is shaped to receive the mounting portion 502 of pole bracket 500. Other shapes of pole mounting portions 502 and receiving channels 403 are contemplated. Hence, the present invention is not limited to a specific shape.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A pole mount bracket, the bracket comprising:
 a first extruded portion, the first extruded portion having a first engaging surface, the first engaging surface having a first plurality of grooves that allow the extruded portion to bend to the form of a pole;
 a second extruded portion, second extruded portion having a second engaging surface, the second engaging surface having a second plurality of grooves that allow the extruded portion to bend to the form of the pole;
 a pole mounting portion connected to the first extruded portion, the pole mounting portion further configured to be selectively coupled to a device; and
 a band configured to deform the first extruded portion about the pole to attach the pole mount bracket to the pole;
 a first connection portion located between the first extruded portion and the pole mounting portion; and
 a second connection portion located between the second extruded portion and the pole mounting portion, wherein the first and second connection portion form a damping cavity, are configured to absorb vibrations, and have aligned mounting band apertures configured to receive the band.

2. The bracket of claim 1, wherein the pole mounting portion has a pole pin aperture that extends throughout a length of the pole mounting portion and is adapted to receive a pin.

3. The bracket of claim 2, further comprising:
 at least one device mount bracket configured to be coupled to a device, the at least one device mount bracket having a device mounting portion configured to be coupled to the pole mounting portion of the pole mounting bracket.

4. The bracket of claim 3, wherein the device mount portion has a device pin aperture that aligns with the pole pin aperture and is adapted to receive the pin.

5. A pole mount bracket, comprising:
 at least one extruded portion, the at least one extruded portion having an engaging surface, the engaging surface having a plurality of grooves that allow the extruded portion to bend to the form of a pole;
 a pole mounting portion connected to the at least one extruded portion, the pole mounting portion further configured to be selectively coupled to a device;
 a band configured to deform the at least one extruded portion about the pole to attach the pole mount bracket to the pole;
 wherein the at least one extruded portion having a plurality of bores extending parallel to the grooves, the at least one extruded portion further having a plurality of channels, each channel extending from the engaging surface of the at least one extruded portion to an associated bore; and
 a plurality of rubber cores, each rubber core having a main portion received in an associate bore, each rubber core further having a neck portion received in an associated channel, each rubber core further yet having an engaging portion that extends beyond the engaging surface of the at least one extruded portion.

6. The bracket of claim 5, wherein at least one of the bores and one of the main portion of the rubber core is in the general shape of a polygon.

7. A pole mounting bracket, the bracket comprising:
 a pole mounting portion configured to be selectively coupled to a device bracket;
 a first extruded portion having a plurality of grooves in a surface thereof to allow the first extruded portion to bend;
 a second extruded portion having a plurality of grooves in a surface thereof to allow the second extruded portion to bend;
 a first connection portion coupled between the pole mounting portion and an end of the first extruded portion;
 a second connection portion coupled between the pole mounting portion and an end of the second extruded portion, wherein the first and second connection portion form a dampening cavity; and
 wherein the first and second connection portions both have aligned mounting band apertures, the mounting band apertures configured to receive a mounting band that straps the bracket to the pole.

8. The bracket of claim 7, further comprising:
 a mounting strap configured to bend the first and second extruded portions about a surface of the pole.

9. The bracket of claim 8, wherein the first and second extruded portions are made of a material that opposes the bending by the mounting strap such that a constant force is asserted on the mounting strap away from the surface of the pole.

10. The bracket of claim 7, wherein the pole mounting portion includes a pole pin aperture that extends through a length of the pole mounting portion.

11. The bracket of claim 7, further comprising:
 a plurality of rubber cores, each rubber core configured to be received in a bore in the first and the second extruded portions, the rubber cores having an engaging portion configured to engage a surface of the pole.

12. A pole mount system, the system comprising:
 at least one pole mount bracket, the at least one pole mount bracket including a pole mounting portion and at least one extruded portion, the pole mounting portion having a pole pin aperture and the at least one extruded portion having a plurality of grooves along a surface that allow the at least one extruded portion to bend to conform to a surface of a pole;

a mounting band configured to attach the at least one pole mount bracket to the pole, the mounting band bending the at least one extruded portion to conform to the surface of the pole, wherein the at least one extruded portion is made of a material that exerts a constant force on the mounting band away from the surface of the pole; and at least one device mount bracket coupled to a device, the at least one device mount bracket further including at least one device mounting portion, the at least one device mounting portion having a device pin aperture that aligns with the pole pin aperture when selectively coupled to the pole mounting portion, wherein the pole pin aperture align; and a holding pin configured to pass through the pole pin aperture and the device pin aperture to selectively couple the device mount bracket to the pole mount bracket.

13. The pole mount system of claim 12, wherein the at least one extruded portion further comprises:

a first extruded portion; and a second extruded portion.

14. The pole mount system of claim 13, further comprising:

a first connection portion coupled between the pole mounting portion and an end of the first extruded portion; and a second connection portion coupled between the pole mounting portion and an end of the second extruded portion, wherein the first and second connection portion form a dampening cavity and adsorb vibrations when mounted to a pole.

15. The pole mount system of claim 12, further comprising:

the at least one extruded portion of the at least one pole mount bracket having a plurality of bores extending parallel to the grooves, the at least one extruded portion further having a plurality of channels, each channel extending from the engaging surface of the at least one extruded portion to an associated bore; and a plurality of rubber cores, each rubber core having a main portion received in an associate bore, each rubber core further having a neck portion received in an associated channel, each rubber core further yet having an engaging portion that extends beyond the engaging surface of the at least one extruded portion.

16. A pole mount bracket, the bracket comprising:

at least one extruded portion having a length and an engaging surface, the at least one extruded portion further having a plurality of bores that extend along its length and a plurality of channels, each channel extending from the engaging surface to an associated bore;

a plurality of rubber cores, each rubber core having a main portion received in an associate bore of the at least one extruded portion, each rubber core further having a neck portion received in an associated channel, the rubber core further yet having an engaging portion that extends beyond the engaging surface of the at least one extruded portion;

a pole mounting portion connected to the at least one extruded portion, the pole mounting portion further configured to be selectively coupled to a device; and a band configured to deform the at least one extruded portion about the pole to attach the pole mount bracket to the pole.

17. The bracket of claim 16, further comprising:

the engaging surface of the at least one extruded portion further having a plurality of grooves that allow the extruded portion to bend to the form a pole, the grooves being positioned between associated channels.

18. The bracket of claim 16, wherein the plurality of bores and the main portion of the rubber core have the general shape of a polygon.

* * * * *